US005188332A

United States Patent [19]

Callas

[11] Patent Number: 5,188,332

[45] Date of Patent: Feb. 23, 1993

[54] SIGN HOLDER

[76] Inventor: Mike T. Callas, 5701 Camelback Dr., Edina, Minn. 55436

[21] Appl. No.: 656,675

[22] Filed: Feb. 19, 1991

Related U.S. Application Data

[63] Continuation-in-part of Ser. No. 500,278, Mar. 28, 1990, Pat. No. Des. 322,634.

[51] Int. Cl.[5] .......... F16M 13/00

[52] U.S. Cl. .......... 248/544; 248/206.5; 248/215; 248/340; 40/600

[58] Field of Search .......... 248/206.5, 544, 214, 248/215, 323, 327, 339, 340; 24/509, 510, 502; 40/600, 617

[56] References Cited

U.S. PATENT DOCUMENTS 1,405,221 1/1922 Jenkins .
3,239,179 3/1966 Margulis .
3,289,338 12/1966 Stephens .......... 40/600
3,372,503 3/1968 Weeks .
3,912,214 10/1975 Karass .......... 248/323
3,953,065 4/1976 Shannon, Jr. .
3,984,931 10/1976 Belokin, Jr. .
4,888,893 12/1989 Jones .......... 40/600
4,960,258 10/1990 Stocker .......... 40/600

*Primary Examiner*—Reinaldo P. Machado
*Attorney, Agent, or Firm*—Burd, Bartz & Gutenkauf

[57] ABSTRACT

A sign holder assembly used to pendently support signs, posters or advertising material from a ceiling or overhead support. The holder assembly has a strip of magnetic material that adheres directly to metal ceiling structures. A channel body accommodates one or more hooks that are attachable to the sign. A gripping tool having an elongated handle is used to locate the holder assembly adjacent the metal ceiling surface and remove the holder therefrom.

37 Claims, 4 Drawing Sheets

SIGN HOLDER

CROSS REFERENCE TO RELATED APPLICATION

This Application is a continuation-in-part of U.S. application Ser. No. 500,278 filed Mar. 28, 1990, now U.S. Pat. No. D 322,634.

FIELD OF THE INVENTION

The invention relates to holding devices for suspending sheet material from an overhead support structure for display, particularly, holders having magnets that adhere directly to metal ceiling structures for supporting sheet signs.

BACKGROUND OF THE INVENTION

Typically, the task of hanging of signage in retail store settings is cumbersome and time consuming. It commonly involves three or more workpersons, the use of ladders, scaffolds, and various hardware to suspend the sheet material from the store ceiling. Electric lifts can be rented for use in putting up signs. Both of these methods are not cost effective. Hanging of signage is limited to open floor space as certain areas are inaccessible with ladders or lifts. Customers may be inconvenienced requiring the signs to be put up and taken down during the time the store is closed for business thereby increasing labor costs.

Ceiling hangers having magnets have been used to support overhead signs. For example, P. Belokin, Jr., in U.S. Pat. No. 3,984,931, discloses an overhead advertising display that is supported on a metal frame of a fluorescent light fixture with U-shaped magnets. However, the light fixture must be mounted on the ceiling prior to the installation of the display.

SUMMARY OF THE INVENTION

The invention is directed to a holder assembly that is magnetically attached to a metal ceiling strip to support a vertical sheet, such as a sign, poster, or advertising material made of paper, cloth or plastic. A tool operable from ground level is used to position the holder assembly adjacent the metal strip and remove the holder from the metal strip. Installation, repositioning and removal of signs is facilitated resulting in reduced labor costs and customer inconvenience.

A preferred embodiment of the holder assembly has an elongated member having a generally tubular body that surrounds a slot. One or more hooks are slidably mounted on the head. Each hook has a connector that extends into the slot to mount the hook on the body. The shape of the connector is complimentary to the shape of the slot. The body has a pair of inwardly directed lower ends or ears that partially close a bottom portion of the slot to retain the connector within the slot. The lower ends of the body are laterally spaced to allow the hooks to be laterally moved along the body. Each hook has an upwardly directed end that is accommodated by a hole in sheet material to attach the sheet material to the holder. The hooks are moved along the body to laterally space the hooks a distance equal to the lateral distance between the holes in the sheet material so that the sheet material can be suspended from the holder in a level position. The member has a head with a generally flat top surface. A generally flat strip of plastic magnetic material is secured to the top surface of the head with an adhesive or like attaching structure. The magnetic strip has an upper surface located above the top of the head that is releasably attachable to magnetic holding material of a ceiling surface. The strip has a holding force sufficient to allow relatively heavy sheet material to be suspended from the ceiling surface. A plurality of hooks can be connected in end-to-end relation to vary the distance between the body and the sheet member. The connector of each hook has a bore adapted to accommodate the upwardly directed end of an adjacent hook to connect the hooks together. A narrow neck secured to the head and body is adapted to be gripped by a tool having an elongated handle. The tool is operable to locate the magnetic strip adjacent the magnetic holding material of the ceiling surface from a floor level.

A modification of the holder assembly has an elongated head having an undercut groove. A generally inverted T-shaped strip of plastic magnetic material is accommodated by the groove. The magnetic strip has an upper surface located above the top surface of the head that is releasably attachable to the magnetic holding material of the ceiling surface to retain the holder assembly thereon. The top surface of the head does not engage the ceiling surface. The magnetic strip has a holding force sufficient to allow relatively heavy sheet material to be suspended from the ceiling surface. Hooks are slidably mounted on a tubular body connected to the head with a neck. The hooks are moved along the body to laterally space the hooks so that the sheet material is suspended therefrom in a level position. The neck is adapted to be gripped by a tool that is operable to locate the magnetic strip adjacent a metal ceiling surface from a floor level.

An embodiment of the gripping tool used to install and remove the holder from a metal support has a body member attached to the end of an elongated pole. The body member has a flat top wall and first jaw. A second jaw is connected to an arm that is pivotally mounted on the body member. A spring engages the body member and arm to bias the second jaw toward the first jaw. A cord attached to the arm is pulled downwardly to open the jaws. The jaws and top wall of the tool can be located in a gripping relation with the holder whereby the magnetic strip can be positioned on the metal ceiling from a floor level.

DESCRIPTION OF PREFERRED EMBODIMENTS

Figure 1:
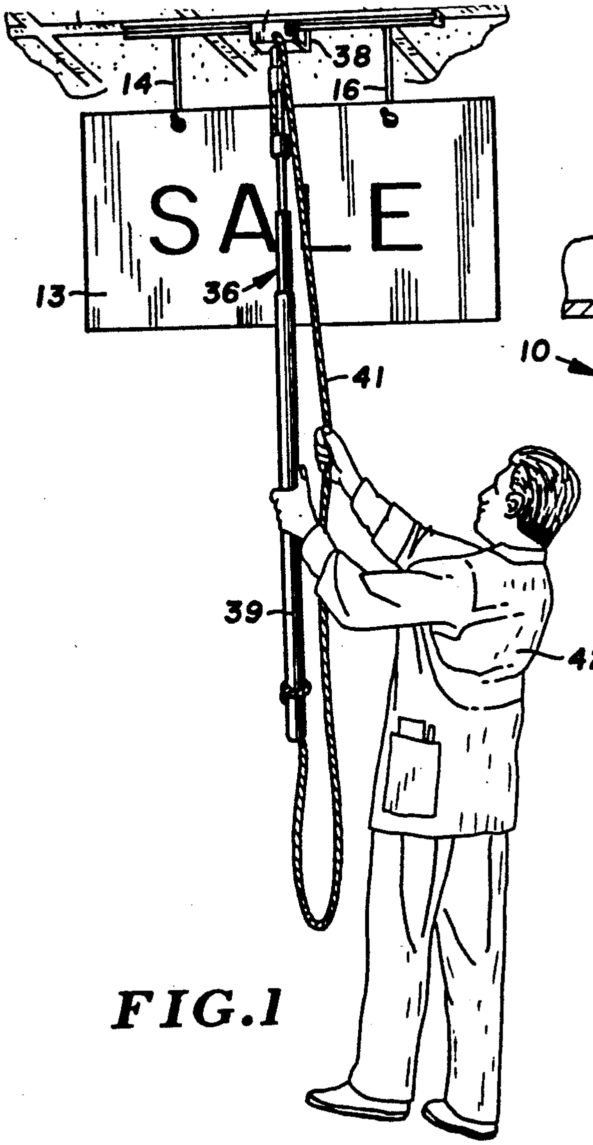
FIG. 1 is a diagrammatic view of the sign holder assembly of the invention supporting a sign and being located adjacent a metal ceiling beam for magnetic attachment of the sign holder to the beam.

Referring to FIG. 1, there is shown a holder of the invention, indicated generally at 10 for supporting a vertical sheet 13, such as a poster, sign or advertisement, for display in a populated area. Holder 10 is adapted to support sheets having custom width and lengths at various heights. Holder 10 can be used with single or multiple sheet suspensions. Sheet 13 is displayed evenly and professionally with holder 10. Holder 10 has magnetic properties that enable the holder to be magnetically attached to a metal ceiling surface of a building, such as a retail store. Holder 10 can be easily and quickly installed on and removed from the metal surface resulting in reduced labor time and costs. An operator 42 standing at ground level uses a gripping tool 36 having an elongated handle 39 to elevate holder 10 in one motion adjacent the metal surface and remove the holder therefrom. This eliminates the use of ladders, lifts, scaffolds and the like, and increases operator safety. The hanging of posters, signs or advertisements from the ceiling with holder 10 can be done by a single workperson during store hours without inconvenience and disruption to customers. Signage with special promotions, sales or seasonal products can be quickly displayed with minimum effort thereby increasing sales.

Figure 2:
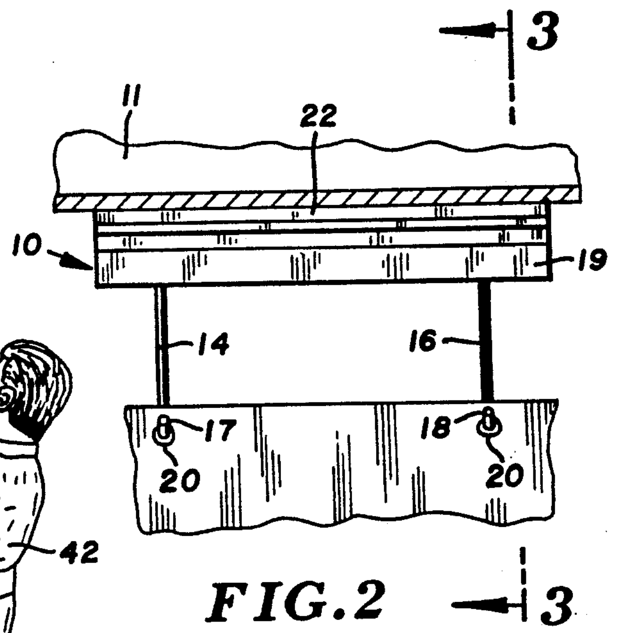
FIG. 2 is a side elevational view of the sign holder attached to a beam.
Figure 3:
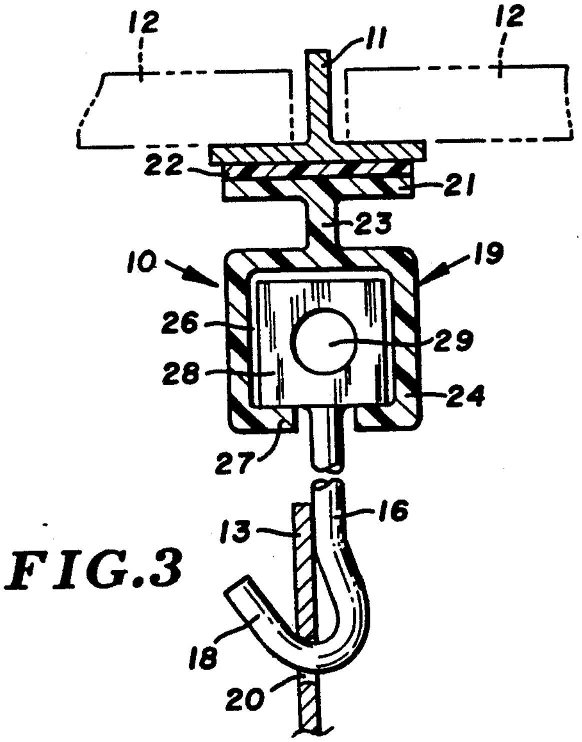
FIG. 3 is an enlarged sectional view taken along the line 3—3 of FIG. 2.

Referring to FIGS. 2 and 3, holder 10 is releasably supported on a metal ceiling strip 11 that is normally used to carry ceiling tiles or panels 12. Strip 11 has a generally T-shaped cross section and is supported from the beams of the ceiling with a plurality of wires, cords or the like (not shown). Holder 10 can also be releasably attached directly to open metal ceiling beams. Holder 10 has a pair of movable hooks 14 and 16 having upwardly extended lower ends 17 and 18 that are accommodated by eyelets 20 in the top of a sheet member 13 to mount sheet 13 on holder 10. Sheet member 13 can be a sign, poster, or advertising material made of paper, cloth or plastic. Hooks 14 and 16 are laterally spaced apart a distance equal to the lateral distance between eyelets 2o of sheet 13 whereby the sheet will be located in a level position when holder 10 is mounted on ceiling strip 11.

Figure 4:
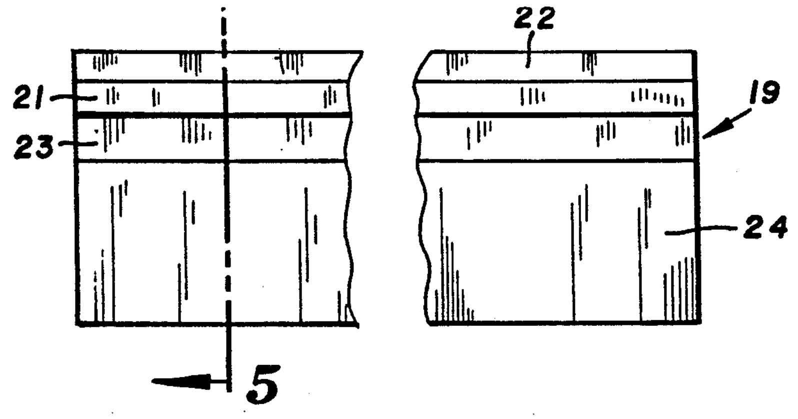
FIG. 4 is an enlarged foreshortened side elevational view of the hanger of the sign holder assembly.
Figure 5:
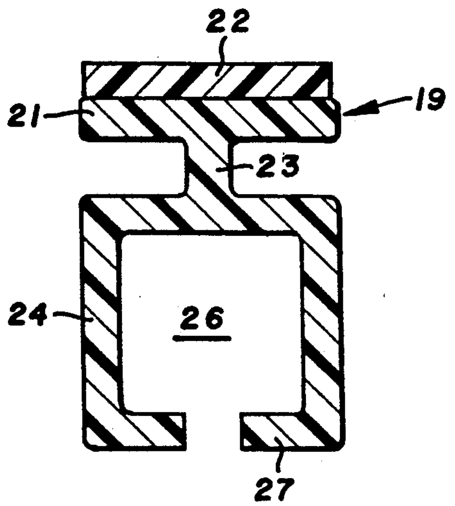
FIG. 5 is an enlarged sectional view taken along the line 5—5 of FIG. 4.

Referring to FIGS. 3 to 5, holder 10 has an elongated member or hanger 19 having a generally horizontal top head 21 having an upper flat surface that supports a magnet 22. Member 19 is a one-piece structure made of plastic or non-magnetic metal, such as aluminum. Magnet 22 is a generally flat elongated plastic strip having a permanent magnetic field impressed thereon. A strip suitable for magnet 22 is produced by B. F. Goodrich Company, Marieita, Ohio, under the name KOROSEAL. KOROSEAL is a plastic composition capable of being easily flexed, can be securely cemented to various types of material, and is available in various widths, thicknesses, and lengths. Magnet 22 is adhesively secured to top surface 21. The width of magnet 22 is substantially the same as the width of top head 21. The ends of magnet 22 are flush with the ends of top head 21. Preferably, magnet 22 has a holding force that allows holder 10 to adhere to metal strip 11 while supporting a relatively heavy sheet member. For example, magnet 22 can support a sheet member weighing up to 5 pounds. Magnets having greater holding forces can be used with holder 10.

Hanger 19 has a downwardly directed vertical, relatively narrow, flat neck 23 that extends between top head 21 and a tubular body 24. Body 24 has a horizontal, generally rectangular groove or slot 26. The bottom of body 24 has a pair of inwardly directed ends 27 that partially close slot 26. Each hook 14, 16 has a cube-shaped slide or connector 28 that is accommodated by slot 26 to mount the hooks on hanger 19. Ends 27 engage the bottom surfaces of connectors 28 to retain connectors 28 in slot 26. Ends 27 are laterally spaced to allow the connectors and hooks 14 and 16 to be laterally moved along body 24. Connectors 28 can be moved to laterally space hooks 14 and 16 a distance equal to the lateral distance between eyelets 20 so that sheet member 13 will be located in a level position. The cube shape of connectors 28 is complimentary to the rectangular shape of slot 26. The width of the lateral space between ends 27 is less than the width of connectors 28 whereby the connectors can only be placed into slot 26 from either end of the slot. This prevents connector 28 from falling out of slot 26 even when hook 14, 16 is turned 90 degrees relative to slot 26. Connectors 28 and slot 26 can have other complimentary shapes.

Figure 6:
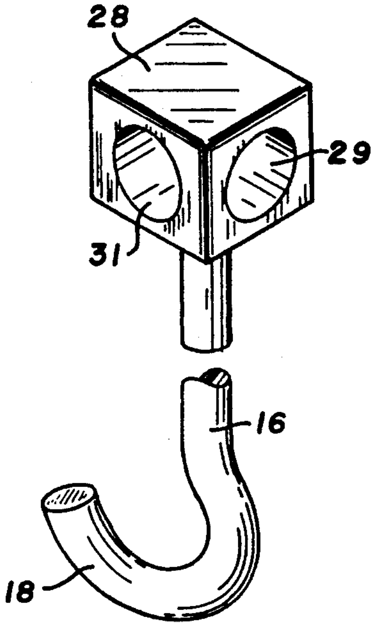
FIG. 6 is a foreshortened perspective view of a hook used with the hanger of the sign holder assembly.
Figure 7:
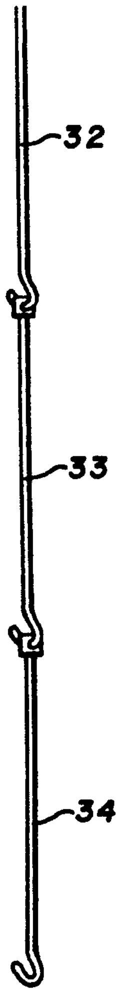
FIG. 7 is a side elevational view of a plurality of connected hooks usable with the hanger of FIG. 4.

Referring to FIG. 7, a plurality of hooks 32, 33 and 34 can be hooked together to change the elevation of sheet member 13. In some installations the height of the ceiling requires the use of a plurality of hooks to position sheet member 13 in a location where it is readily observable. Connector 28 has a bore 29 adapted to accommodate the lower end of an adjacent hook to connect hooks 32 to 34 together. Bore 29 extends from a side face of connector 28 to a front face thereof and opens at 31, as shown in FIG. 6. The lower end of hook 32 extends through bore 29 and projects upwardly from bore end 31 of hook 33. Similarly, the lower end of hook 33 extends through bore 29 and bore end 31 of hook 34. This prevents hooks 32 to 34 from separating from each other when hook 32 is hung from hanger 19.

Returning to FIG. 1, a tool indicated generally at 36 is used to install and remove holder 10 from metal strip 11. Tool 36 has a pair of jaws 37 and 38 operable to grip neck 23 of hanger 19. An elongated handle 39 connected to jaws 37 and 38 allows an operator 42 to place holder 10 on metal strip 11 from floor level. Jaws 37 and 38 are biased with a spring (not shown) into a gripping relation with neck 23. A rope 41 connected to jaw 37 can be pulled by operator 42 to separate jaws 37 and 38. This allows operator 42 to remove tool 36 from holder 10 after the holder has been positioned on strip 11. Handle 39 has a plurality of telescoping sections allowing the length of the handle to be varied relative to the height of the ceiling.

In use, holder 10 is placed on a work surface and connectors 28 of hooks 14 and 16 are placed into slot 26 from either end thereof. Connectors 28 are moved along body 24 to laterally space hooks 14 and 16 a distance equal to the lateral distance between eyelets 20 of sheet member 13. Hook ends 17 and 18 are moved through eyelets 20 to attach sheet member 13 to hanger 19. Additional hooks can be hooked onto hooks 14 and 16 to vary the vertical distance between hanger 19 and the top of sheet member 13 as desired. Jaws 37 and 38 of tool 36 are separated by pulling on rope 41 whereby the jaws can be positioned adjacent neck 23 of hanger 19. Operator 42 releases the pulling force on rope 41 so that jaws 37 and 38 grip neck 23. Utilizing tool 36, operator 42 elevates holder 10 and sheet member 13 adjacent metal strip 11. Magnet 22 adheres to strip 11 to mount holder 10 on the strip and to hold sheet member 13 in a level position. Operator 42 then separates jaws 37 and 38 and removes tool 36 from hanger 19. Magnet 22 has a holding force sufficient to retain holder 10 and sheet member 13 on metal strip 11.

To remove holder 10 from metal strip 11, operator 42 pulls jaws 37 and 38 to the open position with rope 41. Jaws 37 and 38 are positioned adjacent neck 23 and allowed to grip the neck. Operator 42 simply pulls magnet 22 away from metal strip 11 and carries holder 10 with tool 36 to ground level. This allows hanging and removal of signs and the like from store ceilings quickly and easily by a single workperson working from a floor level. Labor time and costs are significantly reduced.

Figure 8:
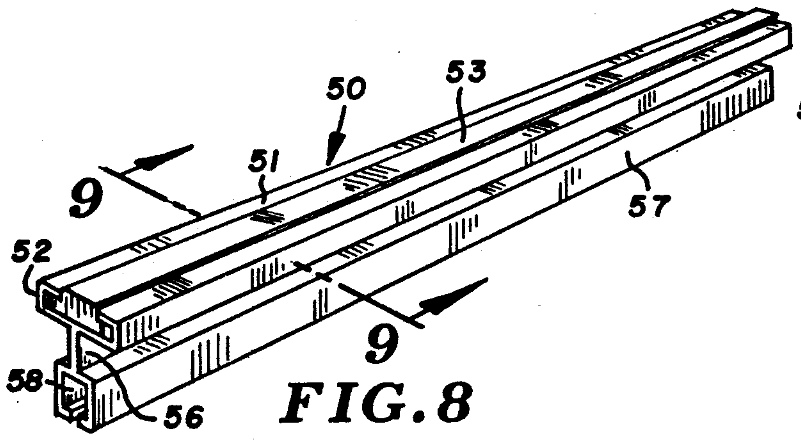
FIG. 8 is a perspective view of a modification of the hanger of the sign holder assembly.
Figure 9:
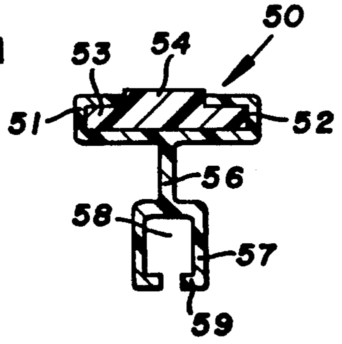
FIG. 9 is an enlarged sectional view taken along the line 9—9 of FIG. 8.

Referring to FIGS. 8 and 9, there is shown a modification of a hanger, indicated generally at 50, usable with holder 10. Hanger 50 has an elongated head or member 51 having an undercut T-shaped groove 52 supporting a generally inverted T-shaped magnet 53. Magnet 53 is an elongated plastic strip having a permanent magnetic field impressed thereon. Magnet 53 can be made of the same material as magnet 22 describe above. The upper surface 54 of magnet 53 projects slightly above the top surface of head 51. This prevents direct contact of head 51 with metal strip 11. Preferably, magnet 53 has a holding force that allows holder 10 to adhere to metal strip 11 while supporting a sheet member weighing up to five pounds. Magnets having greater holding forces can be used with holder 10.

Hanger 50 has a downwardly directed vertical neck 56 secured to a tubular body 57. Body 57 is similar to body 24 described above. Body 57 has a horizontal, generally rectangular groove or slot 58. The bottom of body 57 has a pair of inwardly directed ends 59 that partially close slot 58. Connectors are accommodated by slot 58 to mount hooks on hanger 50 in a manner as shown in FIG. 2. Ends 59 retain the connectors in slot 58. Ends 59 are laterally spaced to allow the connectors to be laterally moved along body 57. The connectors are laterally spaced to correspond with the lateral distance between eyelets 20. This enables sheet member to hang in a level position from hanger 50. The shape of the connectors is complimentary to the rectangular shape of slot 58. The width of the lateral space between ends 59 is less than the width of the connectors whereby the connectors can only be placed into slot 58 from the ends thereof. This prevents the connectors from falling out of slot 58. The connectors and slot 58 can have other complimentary shapes.

Gripping tool 36 is adapted to maneuver hanger 50 adjacent metal ceiling strip 11 whereby magnet 53 adheres to the strip. Installation and removal of hanger 50 and sheet member 13 from ceiling strip 11 can be done by an operator 42 from floor level. Magnet 53 has a holding force to retain hanger 50 and sheet member 13 on metal strip 11.

Figure 11:
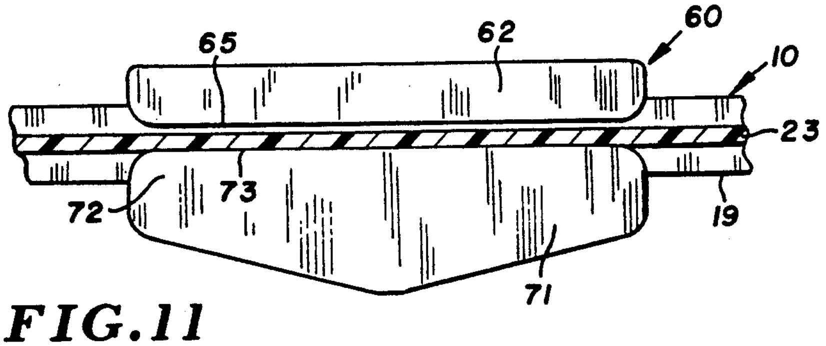
FIG. 11 is a sectional view taken along line 11—11 of FIG. 10.
Figure 10:
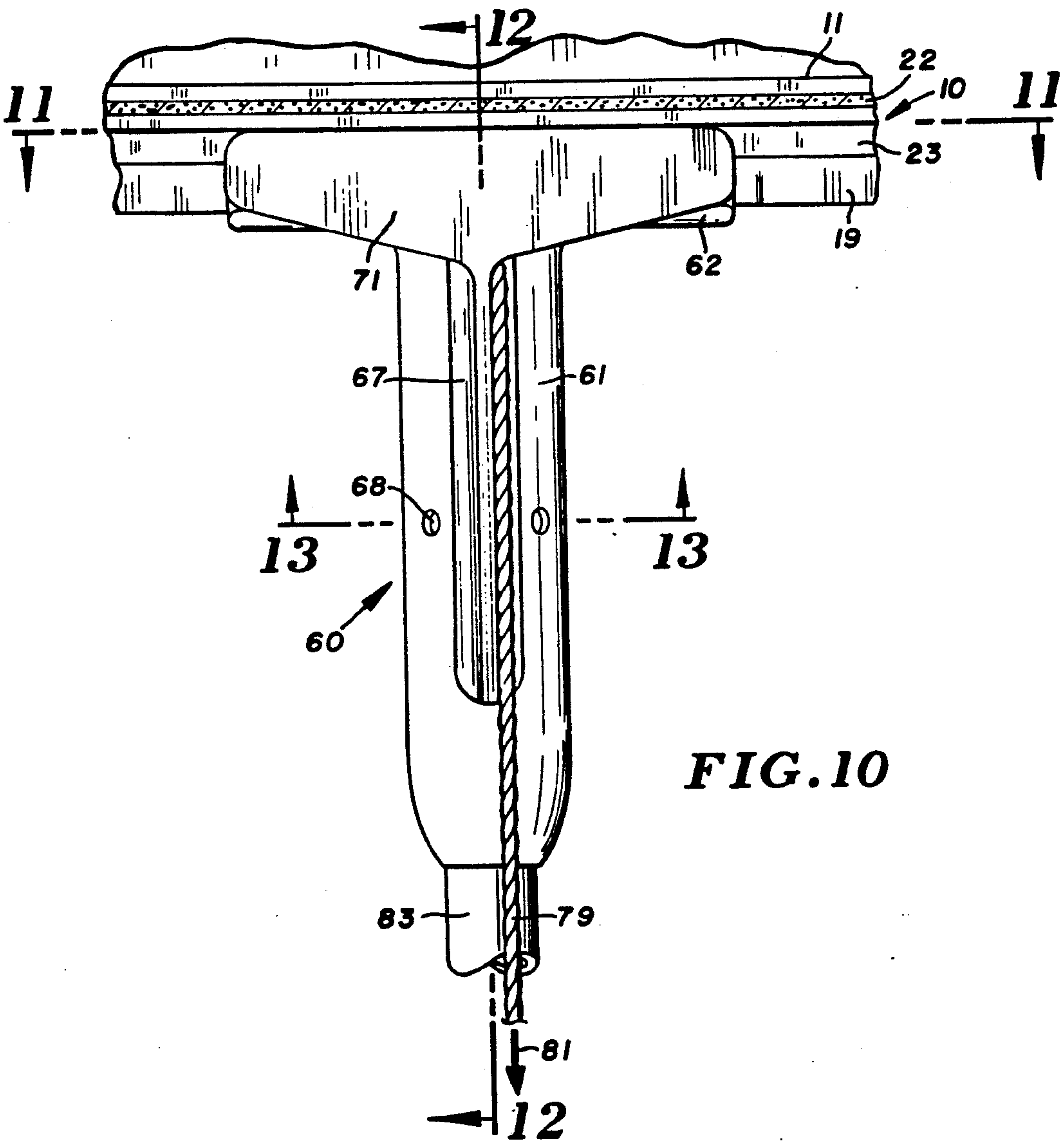
FIG. 10 is an elevational view of the head end of a modification of the gripping tool used to install and remove the holder from a metal support.
Figure 12:
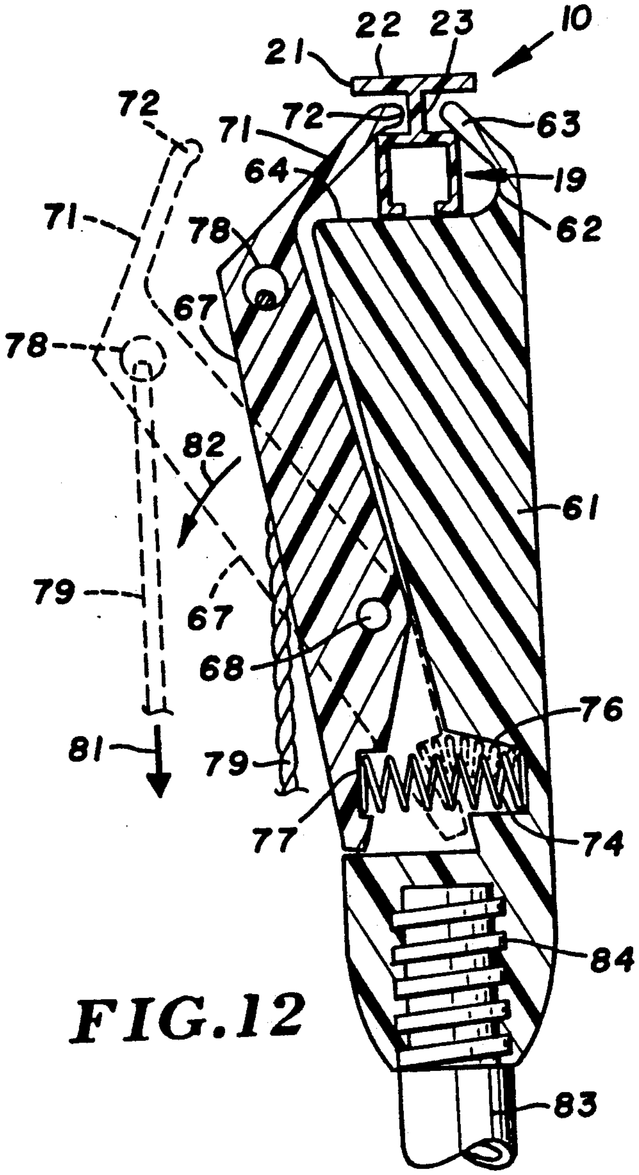
FIG. 12 is a sectional view taken along line 12—12 of FIG. 10.
Figure 13:
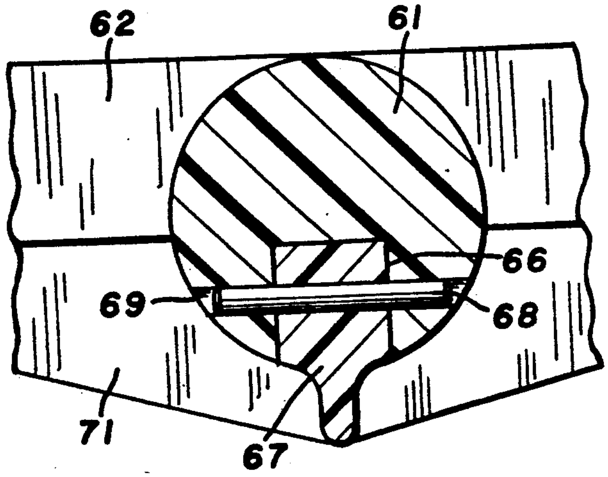
FIG. 13 is an enlarged sectional view taken along line 13—13 of FIG. 10.

Referring to FIGS. 10 to 13, there is shown a modification of a gripping tool, indicated at 60, used to install and remove holder 10 from metal strip 11. Tool 60 has a generally cylindrical body 61 having a generally flat top wall 64. Body 61 has a first jaw 62 having a lip 63 that curves upwardly and inwardly from one end of top wall 64. As shown in FIG. 13, body 61 has a groove 66 that accommodates an elongated, generally rectangular arm 67. Groove 66 extends downwardly and inwardly from top wall 64. A pin 68 located in a bore 69 extending laterally through body 61 and arm 67 pivotally connects arm 67 to body 61. The upper end of arm 67 has an upwardly inclined second jaw 71 having an inwardly directed lip 72. Jaws 62 and 71 and top wall 64 of body 61 cooperate to grip hanger 19.

Referring to FIG. 12, a coil spring 74 is accommodated by pockets 76 and 77 in the lower portions of body 61 and arm 67, respectively. Pockets 76 and 77 are transversely aligned and located below pin 68. The ends of spring 74 engage the lower portions of body 61 and arm 67 thereby biasing the lower portion of arm 67 away from body 61. This causes jaw 71 to be biased toward jaw 62.

The upper portion of arm 67 has a hole 78 for a rope or cord 79. Pulling downwardly on cord 79, as indicated by arrow 81 in FIGS. 10 and 12, causes the upper portion of arm 67 to pivot away from body 61, as indicated by arrow 82 in FIG. 12, and opens jaws 62 and 71. The position of arm 67 when cord 79 is pulled down to open jaws 62 and 71 is shown in broken lines in FIG. 12. The lower portion of arm 67 has an inclined edge that engages the bottom surface of groove 66 when arm 67 is pivoted to open jaws 62 and 71.

An elongated handle or pole 83 connected to body 61 allows an operator to place magnet 22 of holder 10 on metal strip 11 from floor level. As shown in FIG. 12, pole 83 has a threaded upper end that is turned into a threaded socket 84 in the bottom of body 61 to attach pole 83 to body 61. Pole 83 can have a plurality of telescoping sections to allow the length of the pole to be varied relative to the height of the ceiling.

In use, holder 10 is placed on a work surface. Connectors 28 of hooks 14 and 16 are placed into slot 26 of hanger 19 from either end thereof and moved along the hanger to positions corresponding with eyelets 20 of sheet member 13. Cord 79 of tool 60 is pulled in a downward direction, as indicated by arrow 81 in FIG. 12, to pivot arm 67 away from body 61 and open jaws 62 and 71. Body 61 is positioned adjacent hanger 19 whereby lip 63 of jaw 62 engages one top edge of hanger 19 and top wall 64 engages the bottom of the hanger. The pulling force on cord 79 is released allowing spring 74 to move arm 67 toward body 61 whereby lip 72 of jaw 71 engages the opposite top edge of hanger 19. Spring 74 holds jaws 62 and 71 and top wall 64 in a tight gripping relation with hanger 19. As shown in FIG. 11, edge 65 of lip 63 and edge 73 of lip 72 are located adjacent opposite sides of neck 23 below head 21 when jaws 62 and 71 are in the gripping position. Pole 83 is used to elevate holder 10 and sheet material 13 adjacent metal strip 11. Magnet 22 adheres to strip 11 to mount holder 10 on the strip whereby sheet material 13 is suspended from the ceiling. Cord 79 is pulled downwardly to open jaws 62 and 71 so that tool 60 can be separated from holder 10.

To remove holder 10 from metal strip, jaws 62 and 71 are opened and jaw 62 and top wall 64 are moved adjacent hanger 19. Closing jaws 62 and 71 moves the jaws and top wall 64 into gripping relation with hanger 19. Magnet 22 is simply pulled away from metal strip 11. Installing and removing holder 10 from metal strip 11 is completed with minimum effort and time by a single workperson working from a floor level.

While there has been shown and described preferred embodiments of the holder assembly of the invention, it is understood that changes in structure, arrangement of structure, and materials may be made by those skilled in the art without departing from the invention. The invention is defined in the following claims.

I claim:

1. A holder for suspending sheet material from a ceiling surface comprising: an elongate member having body means, at least one hook means slidably mounted on the body means for suspending sheet material from the body means, and magnet means mounted on the member, the magnet means releasably attachable to magnetic holding material to retain the member on the magnetic holding material.

2. The holder of claim 1 wherein: the body means comprises a tubular body having a slot, the hook means having a connector extendable into the slot to mount the hook means on the body.

3. The holder of claim 2 wherein: the body has a pair of inwardly directed lower ends partially closing a bottom portion of the slot to retain the connector within the slot.

4. The holder of claim 3 wherein: the lower ends of the body are laterally spaced allowing the hook means to be laterally moved along the body to a selected position.

5. The holder of claim 1 wherein: the member has a head having a generally flat top surface, the magnet means comprising a generally flat strip of plastic magnetic material secured to the top surface.

6. The holder of claim 5 wherein: the strip has an upper surface located above the top surface releasably attachable to the magnetic holding material to retain the member on the magnet holding material.

7. The holder of claim 6 wherein: the strip has a holding force allowing sheet material weighing up to five pounds to be suspended from the magnet holding material.

8. The holder of claim 1 wherein: the body means has an undercut groove, the magnet means comprising a strip of plastic magnetic material accommodated by the groove.

9. The holder of claim 8 wherein: the strip has an upper surface located above a top surface of the body means releasably attachable to the magnetic holding material to retain the body means on the magnetic holding material.

10. The holder of claim 1 wherein: the hook means comprises a plurality of hooks connected in end-to-end relation, each hook having an upper end and a lower end, the upper end having a bore adapted to accommodate the lower end of an adjacent hook to connect the hooks together.

11. The holder of claim 10 wherein: the body means comprises a tubular body having a slot, the upper end of one of the hooks extendable into the slot to mount the hooks on the body.

12. The holder of claim 1 wherein: the member has a neck secured to the body means for accommodating holding means operable to locate the magnet means adjacent the magnetic holding material.

13. A magnetic holder assembly for suspending sheet material from a metal ceiling surface, the holder adapted to be located adjacent the metal ceiling surface for magnetic attachment thereto with a gripping tool having an elongated handle from a floor level, comprising: a member including body means having means defining slot means, first hook means having first connector means, second hook means having second connector means, the first and second connector means extendable into the slot means to slidably mount the first and second hooks means on the body means, the body means having means engageable with the first and second connector means to retain the connector means within the slot means, the first and second hooks means moveable along the body means to laterally space the first hook means from the second hook means at selected distances, and magnetic means mounted on the member, the magnetic means having an upper surface located above a top surface of the member whereby the magnetic means is releasably attachable to the metal ceiling surface for suspending sheet material therefrom in a level position.

14. The holder of claim 13 wherein: the gripping tool has a body member having a first jaw, and an arm pivotally mounted on the body member having a second jaw, the second jaw moveable toward the first jaw to grip the body means.

15. The holder of claim 14 wherein: the gripping tool has biasing means operable to bias the second jaw toward the first jaw.

16. The holder of claim 15 wherein: the arm has a hole accommodating means to move the second jaw away from the first jaw.

17. The holder of claim 14 wherein: the body member has a top wall adjacent the first jaw, the wall engageable with the body means when the first and second jaws are moved into gripping relation with the body means.

18. The holder of claim 13 wherein: the magnetic means comprises a strip of plastic material having a permanent magnetic field impressed thereon.

19. The holder of claim 13 wherein: the body means comprises a generally tubular body, the means engageable with the first and second connector means comprising a pair of inwardly directed ends of the tubular body partially closing a bottom portion of the slot means.

20. The holder of claim 19 wherein: the ends are laterally spaced thereby allowing the first and second hook means to be laterally moved to selected positions along the tubular body.

21. The holder of claim 19 wherein: the first and second connector means each have a shape complimentary to the slot means defined by the tubular body.

22. A holder for a sign releasably supported on a metal ceiling surface, the holder adapted to be located adjacent the ceiling surface for attachment thereto with gripping means, comprising: an elongated member having a tubular body surrounding a slot, hook means mounted on the body for suspending a sign from the body, the hook means having connector means extendable into the slot to mount the hook means on the body, the body having a pair of inwardly directed ends partially closing a bottom portion of the slot thereby retaining the connector means within the slot, and magnetic means mounted on the member releasably attachable to the metal ceiling surface to retain the member on the ceiling surface for suspending a sign from the metal ceiling surface.

23. The holder of claim 22 wherein: the member has a head having a generally flat top surface, the magnetic means comprising a strip of plastic magnetic material secured to the top surface of the head.

24. The holder of claim 22 wherein: the lower ends of the body are laterally spaced, the slot slidably accommodating the connector means whereby the hook means can be laterally moved along the body.

25. The holder of claim 22 wherein: the hook means comprises a pair of hooks, each hook having a connector end and an upwardly directed end, the connector end slidably accommodated by the slot allowing the hook to be moved along the body to a selected position.

26. The holder of claim 22 wherein: the member has a head with an undercut groove, the magnetic means comprising a generally inverted T-shaped strip of plastic magnetic material accommodated by the groove.

27. The holder of claim 26 wherein: the head has a top surface, the strip has an upper surface located above a top surface of the head releasably attachable to the metal ceiling surface to retain the member on the ceiling surface.

28. The holder of claim 26 wherein: the member has a neck secured to the body and head, said neck adapted to accommodate the gripping means.

29. The holder of claim 28 wherein: the gripping means comprises a gripping tool having an elongated handle.

30. The holder of claim 22 wherein: the gripping means has a top section having a first jaw, and an arm pivotally mounted on the top section having a second jaw, the second jaw moveable toward the first jaw to grip the body.

31. The holder of claim 30 wherein: the gripping means has biasing means operable to bias the second jaw toward the first jaw.

32. The holder of claim 31 wherein: the arm has a hole accommodating means operable to move the second jaw away from the first jaw.

33. The holder of claim 32 wherein: the top section has a top wall adjacent the first jaw, the wall engageable with the body when the first and second jaws are moved into gripping relation with the body.

34. A tool used to install and remove a magnetic sign holder from a metal support comprising: a body attached to an end of an elongated pole, the body having a first jaw engageable with the holder, arm means pivotally mounted on the body, a second jaw connected to the arm means, the second jaw moveable toward the first jaw into engagement with the holder whereby the first and second jaws grip the holder allowing the holder to be positioned on the metal support from a floor level.

35. The tool of claim 34 including: biasing means engageable with the body and arm means to bias the second jaw toward the first jaw.

36. The tool of claim 35 including: means attached to the arm means operable to move the second jaw away from the first jaw.

37. The tool of claim 34 wherein: the body has a top wall adjacent the first jaw, the wall engageable with the holder when the first and second jaws are moved into gripping relation with the body.

* * * * *